(12) United States Patent
Trautmann et al.

(10) Patent No.: US 11,511,631 B2
(45) Date of Patent: Nov. 29, 2022

(54) LEADFRAME FOR A BATTERY APPARATUS OF AN ELECTRIC VEHICLE

(71) Applicant: Dr. Ing. h.c. F. Porsche Aktiengesellschaft, Stuttgart (DE)

(72) Inventors: Philipp Trautmann, Stuttgart (DE); Calin Baicu, Moensheim (DE); Graef Guenther, Friolzheim (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 338 days.

(21) Appl. No.: 16/789,506

(22) Filed: Feb. 13, 2020

(65) Prior Publication Data
US 2020/0254886 A1 Aug. 13, 2020

(30) Foreign Application Priority Data
Feb. 13, 2019 (DE) ...................... 10 2019 103 569.4

(51) Int. Cl.
*B60L 50/64* (2019.01)
*B60L 50/60* (2019.01)
(Continued)

(52) U.S. Cl.
CPC .............. *B60L 50/64* (2019.02); *B60L 50/66* (2019.02); *B60L 58/26* (2019.02); *H01M 10/613* (2015.04); *H01M 10/625* (2015.04); *H01M 10/6568* (2015.04); *H01M 50/183* (2021.01); *H01M 50/20* (2021.01); *H01M 50/204* (2021.01); *H01M 50/249* (2021.01); *H01M 50/289* (2021.01); *H01M 10/656* (2015.04); *H01M 50/209* (2021.01);
(Continued)

(58) Field of Classification Search
CPC .......... B60L 50/64; B60L 50/66; B60L 58/26; H01M 10/613; H01M 10/625; H01M 10/656; H01M 10/6568; H01M 2220/20; H01M 50/183; H01M 50/20; H01M 50/204; H01M 50/249; H01M 50/262; H01M 50/289; H01M 50/209; Y02E 60/10; Y02P 70/50; Y02T 10/70
See application file for complete search history.

(56) References Cited

U.S. PATENT DOCUMENTS

| 2010/0285346 A1 | 11/2010 | Graban et al. |
| 2018/0186227 A1 | 7/2018 | Stephens et al. |
| 2021/0351455 A1* | 11/2021 | Kim ................. H01M 10/6554 |

FOREIGN PATENT DOCUMENTS

| DE | 10 2017 011 994 | 1/2019 |

OTHER PUBLICATIONS

German Examination Report dated Nov. 28, 2019.

* cited by examiner

*Primary Examiner* — Lingwen R Zeng
(74) *Attorney, Agent, or Firm* — Gerald E. Hespos; Michael J. Porco

(57) ABSTRACT

A leadframe (10) for a battery apparatus (100) of an electric vehicle, having an encircling frame section (20) and at least one separating section (30) that subdivides the frame section (20) into at least two module receptacles (40) for receiving in each case one cell module (120). The encircling frame section (20) has an encircling outer seal (50) for sealing off against the passage of liquid. Additionally, the at least one separating section (30), together with the frame section (20), has an inner seal (60) that encircles each module receptacle (40) for sealing off against the passage of liquid.

10 Claims, 4 Drawing Sheets

(51) Int. Cl.
*H01M 10/625* (2014.01)
*H01M 10/6568* (2014.01)
*B60L 58/26* (2019.01)
*H01M 50/20* (2021.01)
*H01M 50/183* (2021.01)
*H01M 10/613* (2014.01)
*H01M 50/204* (2021.01)
*H01M 50/249* (2021.01)
*H01M 50/289* (2021.01)
H01M 50/262 (2021.01)
H01M 50/209 (2021.01)
H01M 10/656 (2014.01)

(52) U.S. Cl.
CPC ...... *H01M 50/262* (2021.01); *H01M 2220/20* (2013.01); *Y02E 60/10* (2013.01); *Y02P 70/50* (2015.11); *Y02T 10/70* (2013.01)

LEADFRAME FOR A BATTERY APPARATUS OF AN ELECTRIC VEHICLE

CROSS REFERENCE TO RELATED APPLICATION

This application claims priority under 35 USC 119 to German Patent Appl. No. 10 2019 103 569.4 filed on Feb. 13, 2019, the entire disclosure of which is incorporated herein by reference.

BACKGROUND

Field of the Invention

The invention relates to a leadframe for a battery apparatus of an electric vehicle, to a battery apparatus having a leadframe of this kind and also to a method for producing a battery apparatus of this kind.

Related Art

An electric vehicles has a battery apparatus to provide the electrical energy for driving the electric vehicle. The battery apparatus of this kind has a large number of individual battery cells. The battery cells are often are put together to form cell modules for the purpose of improved structure and easier mounting. Cell modules of this kind are combined in a battery frame for the battery apparatus.

One disadvantage of the known battery apparatus is that the temperature of the individual battery cells has to be controlled during operation of the electric vehicle. In particular, this involves cooling of the battery cells. A cooling liquid is often used for this purpose. The cooling liquid usually is electrically conductive and therefore has to be physically separated from the electrically conductive components. This physical separation also has to be provided with appropriate sealing measures to protect current-carrying parts from cooling liquid that may escape. This also applies to cooling the cell modules that likewise have to be sealed off from liquid escaping from the cooling apparatus. As a result, leaks can occur, particularly in the abutment regions between an encircling battery frame on the one hand and the connection of the individual cell modules on the other hand. The leaks may allow the cooling liquid to escape the battery apparatus, but also may be leaks between adjacent cell modules. Any leak is undesired, but leaks between adjacent cell modules are problematic because only a predefined coolant flow can result in the predefined cooling effects. In the case of known leadframes, leaks are prevented with a very high level of structural expenditure. In particular, very precise production is required in abutment regions during assembly and production of the battery apparatus to keep the risk of undesired leaks as low as possible.

An object of the invention is to at least partially eliminate leaks. A particular object of the invention is to improve the leaktightness of a battery apparatus in a cost-effective and simple manner.

SUMMARY

The invention provides a leadframe for a battery apparatus of an electric vehicle. To this end, the leadframe has an encircling frame section and at least one separating section. The separating section subdivides the frame section into at least two module receptacles, each of which receives one cell module. Furthermore, the encircling frame section is equipped with an encircling outer sealing means for sealing against the passage of liquid. The at least one separating section, together with the frame section, further has an inner sealing means that encircles each module receptacle for sealing against the escape of liquid.

Therefore, according to the invention, the leadframe is based on known battery apparatuses that provide a mechanically stable structure to receive the individual cell modules having the individual battery cells. Liquid cooling is achieved by causing a cooling liquid to flow through the individual cell modules. A double seal is provided to prevent the undesired escape of the cooling liquid. This double seal runs from the inside to the outside starting from the respective cell module and is reflected in the appropriate structural features of the leadframe.

The leadframe is encircled by the frame section also prespecifies the entire geometric extent of the leadframe laterally and in end sections. The inner space or the inner section that is surrounded by the frame section is divided or subdivided by at least one separating section. This subdivision may be regular or substantially regular. Therefore, subdivision of the frame section into at least two, but preferably considerably more, module receptacles is produced by the separating section. Accordingly, the individual separating sections form the crossmembers or the cross-member sections of the leadframe to all intents and purposes.

The cell modules can now be inserted into the individual module receptacles, and then the cooling liquid can flow through the cell modules. The cooling liquid is located in the cell modules, and sealing off is provided to prevent the undesired escape of said cooling liquid.

The sealing off explained above is provided in two stages. The first stage is the inner stage that is formed by an inner sealing means in each case. To this end, each module receptacle is completely surrounded by an inner sealing means. In the simplest case, the frame section has only one single separating section and two module receptacles. In this case, two inner sealing means also are provided and completely surround the module receptacle over the separating section and the frame section. If more module receptacles are provided, the number of inner sealing means preferably is identical or substantially identical to the number of module receptacles.

The inner sealing means, over their course around the module receptacle, extend partially through the separating section, partially through the frame section and partially through adjacent separating sections. Depending on the actual arrangement of the module receptacle, this is produced at the edge or centrally in the frame section.

The inner sealing means are provided specifically for the respective module receptacle and the respective cell module for the corresponding sealing function. The inner sealing means serve first to prevent escape of the cooling liquid to the surrounding area and second to prevent the cooling liquid from passing to adjacent cell modules. It also is noted that preferably two inner sealing means run in each separating section. This is due to the fact that the separating section separates two adjacent module receptacles from one another, and a separate inner sealing means runs through this joint or separating separating section for each module receptacle.

The outer sealing means is provided as the second sealing stage and for preventing undesired abutment in sealing sections. The outer sealing means is common sealing means since it surrounds at least two, in particular all, module receptacles. The outer sealing means therefore serves as additional security if liquid were to be forced out of the individual module receptacle through the respective inner sealing means or cooling liquid escapes to outside an inner sealing area. Therefore, a two-stage sealing situation is created that considerably improves the sealing-off situation and considerably reduces the probability of leakage.

As explained above, both the inner sealing means and the outer sealing means are arranged integrally around a sealed-off area in each case. In the sealed-off area, the inner sealing means is the respective module receptacle, while the outer sealing means is guided around the entire frame section. In contrast to the prior art, undesired abutment of separate sealing means in a corresponding abutment section is avoided by the respective sealing means being completely surrounded. Undesired leaktightness problems are reduced considerably in this way. In the same way, the double sealing considerably increases the security against leakage.

The at least one separating section may subdivide the frame section into identical or substantially identical module receptacles. Therefore, each subdivision is uniform division of the frame section. This also enables the inner sealing means of the leadframe to be of identical or substantially identical design. This simplifies the complexity of the entire system of the leadframe and reduces the expenditure for assembly. The identity or the uniformity of the individual components relates at least to the geometric dimensions.

The frame section for each module receptacle may have at least one tolerance section. A tolerance section of this kind can also be called a tolerance compensation section and functions to provide an option for geometric compensation in the event of temperature differences. The battery apparatus can adopt different operating temperatures in different operating situations. This has an effect on the geometric dimensions of the leadframe by means of the corresponding temperature coefficients. Accordingly, length compensation that compensates for temperature fluctuations and avoids undesired deformation or tension, can be provided in the tolerance sections, for example by appropriately folded material of the frame section. The tolerance sections can be oriented along the separating section, along the frame section, but also transverse to said sections. As an alternative, the leadframe can have an interruption with a flexible element, for example composed of a rubber material, for the tolerance section. Manufacturing tolerances and situations of expansion can be compensated for by these variants for a tolerance section.

Each module receptacle can have a tolerance section in the frame section on either side of the respective module receptacle. The tolerance section can be arranged symmetrically or substantially symmetrically on either side of the module receptacle. The separating sections also can have similar or even identical tolerance sections. Symmetrical geometric compensation reduces or avoids twisting or tension of the leadframe.

At least one fastening section is arranged in the frame section between the outer sealing means and the inner sealing means for the purpose of fastening to a battery frame of the battery apparatus. A fastening section of this kind can be provided, for example, for reversible or irreversible fastening. The arrangement between the sealing means leads to the fastening section being able to be designed freely from the respective sealing means. Therefore, there is a geometric and structural separation between the adjacent sealing means and the fastening section. The fastening section may have a fastening direction that allows the sealing force to be introduced into the system together with the fastening force. Therefore, both the formation of the leaktightness functionality and also the formation of the fastening functionality can be provided together with the arrangement of an appropriate fastening means.

The outer sealing means and the inner sealing means may be arranged in a common sealing plane to reduce or avoid distortion of the entire system of the leadframe when introducing the sealing force. The leadframe and the frame section or the separating sections can also be of flat or planar. Furthermore, the common sealing plane makes it easier to insert the sealing means into the leadframe. In this case, the individual sealing means can have a round or substantially round cross section.

A cooling fluid connection may be arranged outside the above-described sealing plane in the frame section. The cooling fluid connection allows cooling liquid to be introduced into the respective cell module and to be discharged from said cell module. The differentiation or the arrangement of the cooling fluid connection outside the sealing plane allows mounting of the cooling fluid connection separately from formation of the seal. Therefore, the cooling fluid connection has absolutely no influence on the sealing-off situation. Rather, the cooling fluid connection can be arranged and fastened following sealing off of the individual cell modules.

The frame section and/or the at least one separating section may have mounting sections for mounting the cell modules. The mounting sections may be support surfaces. However, the fastening sections that already have been explained can be arranged to complement the mounting function. Laying or fastening the individual cell modules defines the relative position of the cell modules to the leadframe in the respective module receptacles.

The invention also relates to a battery apparatus for an electric vehicle having a battery frame to which the above-described leadframe is fastened and in which cell modules with battery cells are arranged. Therefore, a battery apparatus according to the invention produces the same advantages as explained in detail with reference to the leadframe of the invention.

The invention also relates to a method for producing a battery apparatus, comprising the following steps:
 inserting cell modules into the battery frame, and
 fitting and fastening the leadframe to the cell modules and/or the battery frame.

The method achieves the same advantages as have been explained in detail with reference to a battery apparatus and a leadframe according to the invention. The sealing off can also be implemented at the same time as the fastening.

Further advantages, features and details of the invention can be found in the following description in which exemplary embodiments of the invention are described in detail with reference to the drawings. In this case, the features mentioned in the claims and in the description can each be essential to the invention on their own or in any desired combination.

DETAILED DESCRIPTION

Figure 1:
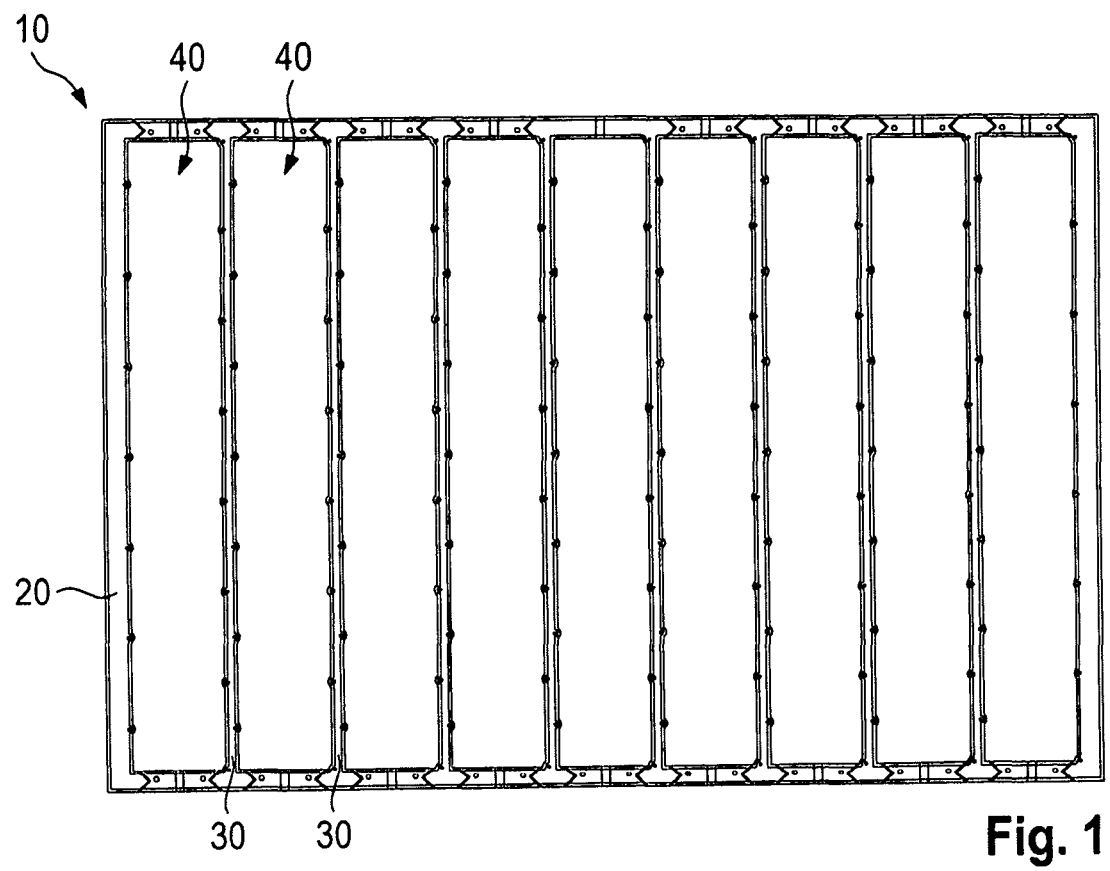
FIG. 1 schematically shows a leadframe according to an embodiment the invention.
Figure 2:
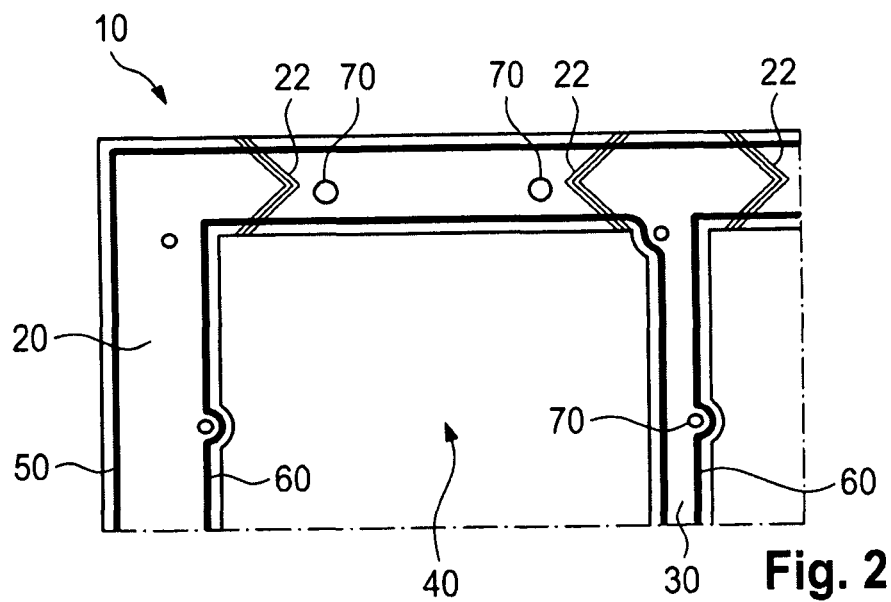
FIG. 2 schematically illustrates a detail of the embodiment of FIG. 1.

FIGS. 1 and 2 schematically show a leadframe 10 according to the invention. Said leadframe is produced in one piece from a base material and has an encircling frame section 20. Said frame section 20 is accordingly subdivided into nine module receptacles 40 by a large number of eight individual separating sections 30.

As shown in FIG. 2, two sealing boundaries can be seen. Said sealing boundaries are, firstly, an inner sealing means 60 which surrounds each of the module receptacles 40. To this end, the inner sealing means 60 runs partially through the frame section 20 and partially through the respective separating section 30. Furthermore, an outer sealing means 50 is provided, which is arranged only in the frame section 20. Said outer sealing means 50 therefore surrounds the entire frame section and serves as a second outer protection arrangement against the passage of liquid from the outside to the inside into the area in which the electrical components are installed.

Furthermore, FIG. 2 shows the arrangement of tolerance sections 22. Said tolerance sections serve to provide tolerance compensation, in the transverse direction in FIG. 2. Heating of the battery apparatus 100 and, in particular, the cell modules 120 in the module receptacles 40 can lead to a thermal change and therefore a geometric change in length of the base material of the leadframe 10. The tolerance sections 22 allow compensation of geometric changes of this kind but also compensation of manufacturing-related tolerance differences.

Figure 3:
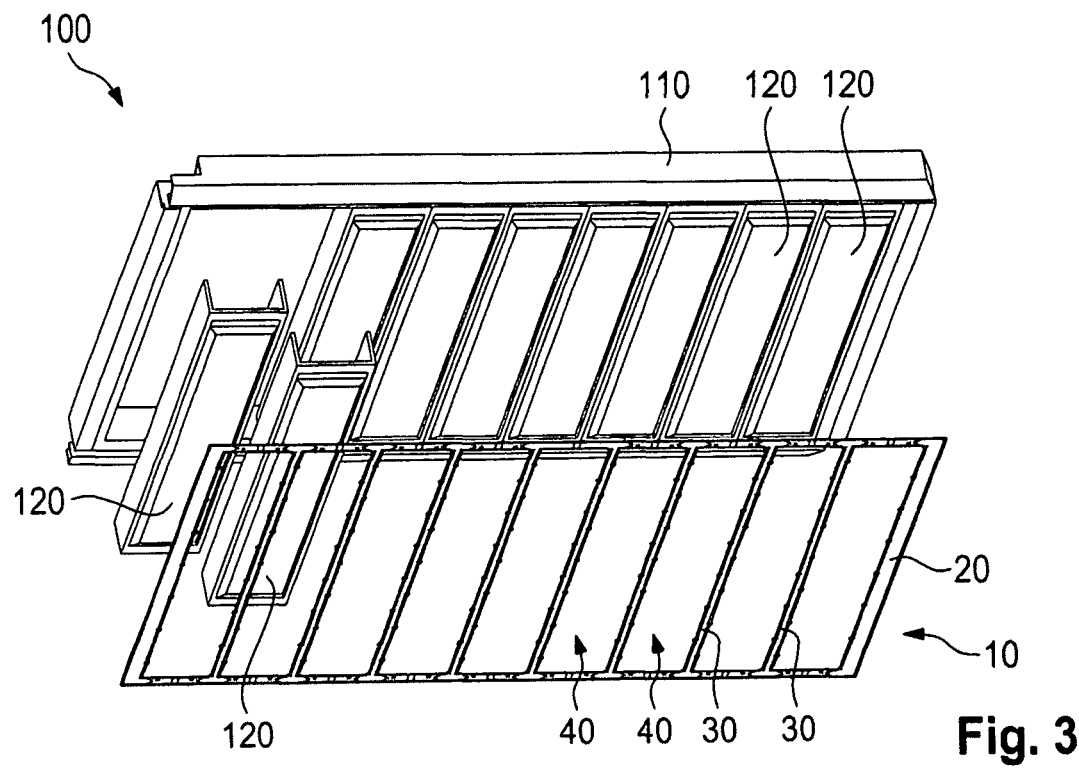
FIG. 3 schematically shows a step during assembly of a battery apparatus.
Figure 4:
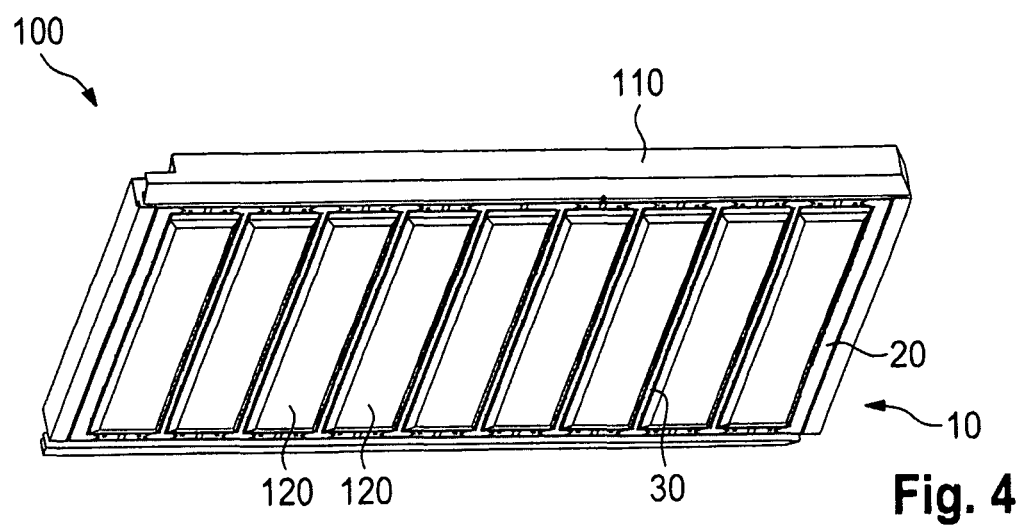
FIG. 4 schematically shows the end of the assembly according to FIG. 3.

FIG. 3 illustrates how an assembly method according to the invention can take place. Here, the individual cell modules 120 are inserted from the bottom side into a battery frame 110 of the battery apparatus 100. In contrast to the illustration of FIG. 3, said individual cell modules are preferably already equipped or filled with individual battery cells at this time. After the mounting and arrangement of the cell modules 120, the leadframe 10 is fitted from below, so that firstly final mechanical assembly, but also sealing off of the cell modules 120, can be ensured. The end of this assembly method is shown, for example, in FIG. 4.

Figure 5:
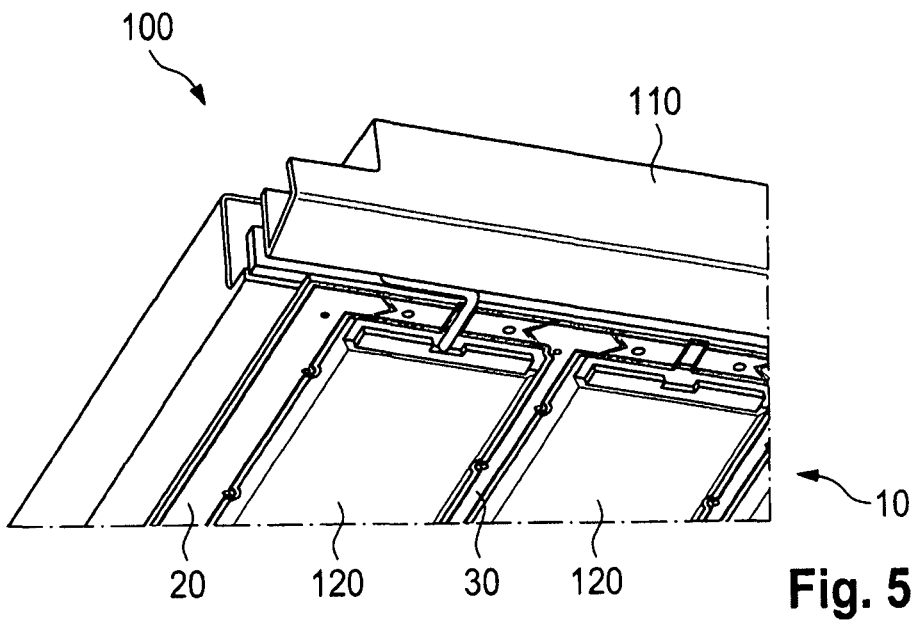
FIG. 5 schematically shows a detail relating to FIG. 4.
Figure 6:
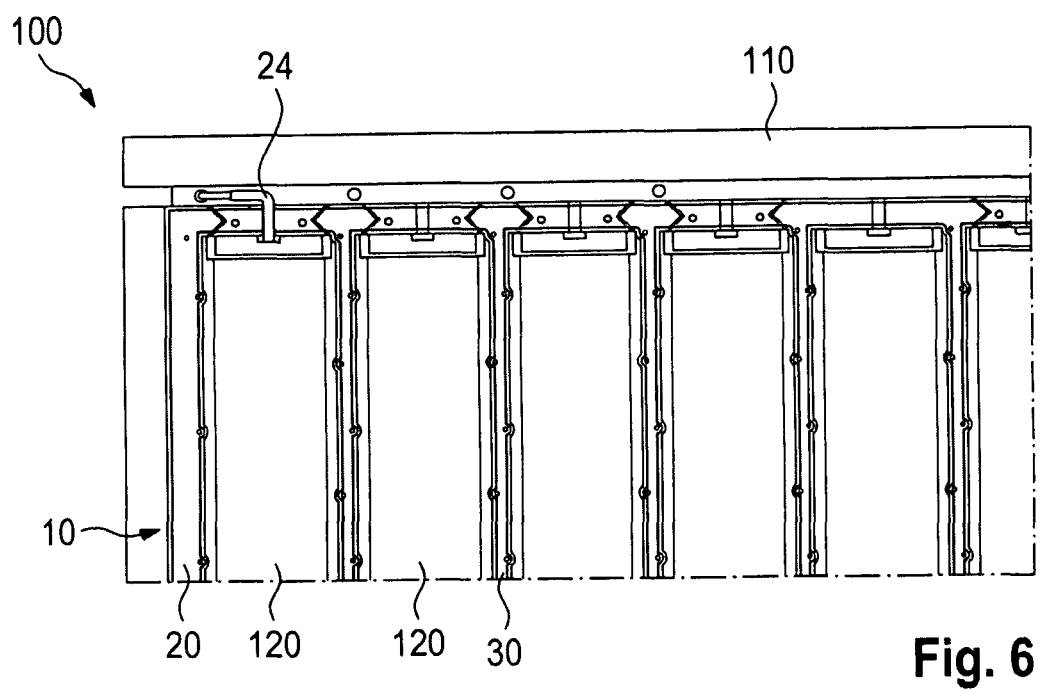
FIG. 6 shows a view of FIGS. 4 and 5 from below in detail.
Figure 7:
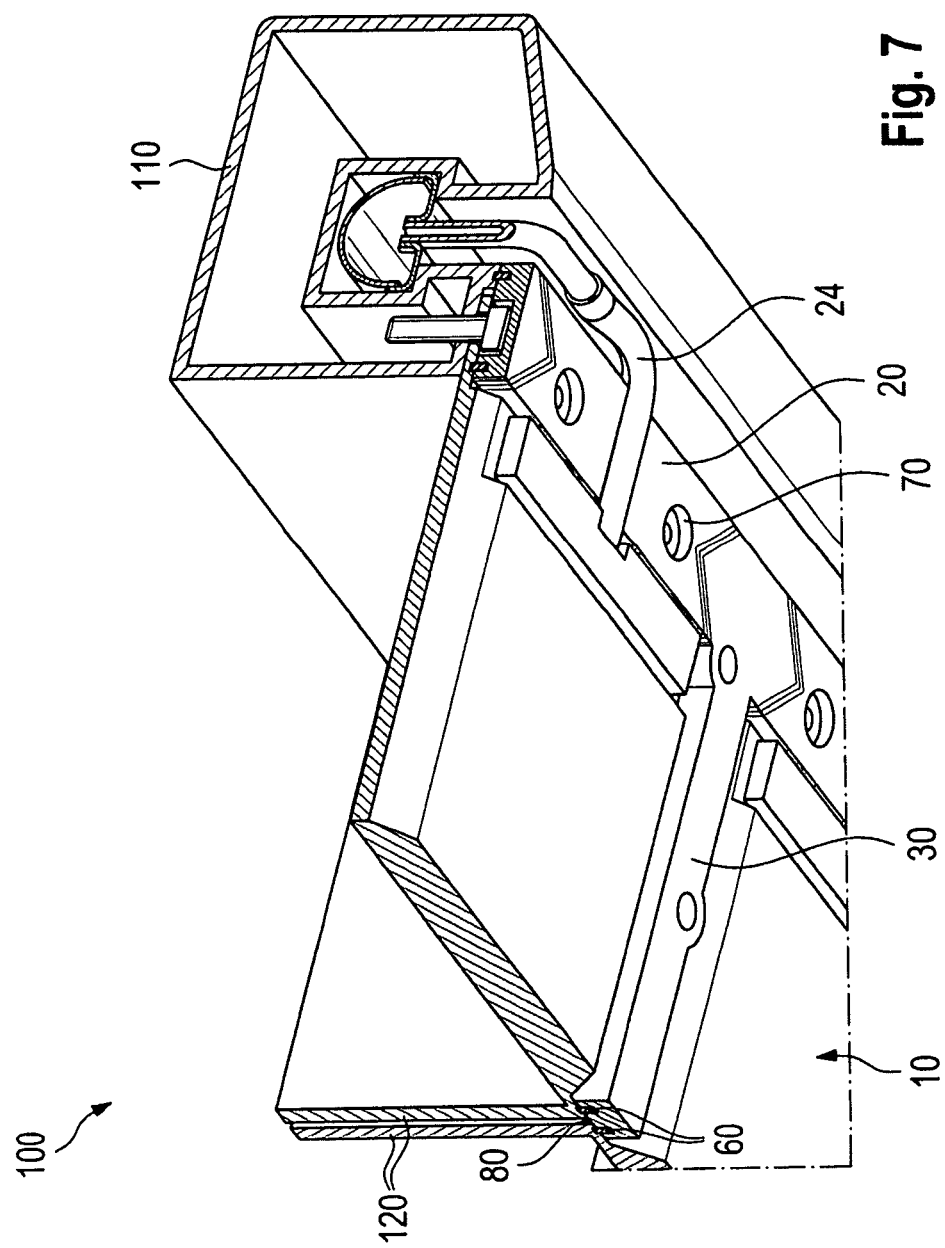
FIG. 7 schematically shows a schematic partial cross section through the embodiments of FIGS. 3 to 6.

Following mounting and formation of the seal, a cooling fluid connection 24 can now further be fitted to the respective cell module 120, as shown in FIGS. 5, 6 and 7 for example. As is clearly shown in FIG. 7, the cooling fluid connection 24 is situated below the common sealing plane of all sealing means 50 and 60.

Furthermore, FIGS. 5 and 7 also clearly show how a fastening section 70 can be provided in order to be able to establish fastening to the battery frame 110 between the adjacent sealing means 50 and 60.

FIG. 7 furthermore also shows mounting sections 80 on which the individual cell modules 120 can be fitted from the top side. Furthermore, the arrangement of the respectively inner sealing means 60 is also provided specifically in these mounting sections 80.

The above explanation of the embodiments describes the invention only within the scope of examples. It goes without saying that individual features of the embodiments can be freely combined with one another, in as much as this is technically feasible, without departing from the scope of the invention.

What is claimed is:

1. A leadframe assembly for a battery apparatus of an electric vehicle, the leadframe assembly comprising:
    a leadframe produced in one piece from a base material and having an encircling frame section and separating sections, each of the separating sections extending between two spaced apart locations on the encircling frame section so that the separating sections subdivide the encircling frame section into a plurality of module receptacles for receiving in each case one cell module, each of the module receptacles being formed by part of the encircling frame section and at least one of the separating sections;
    a plurality of inner sealing means projecting from a surface of the leadframe and respectively surrounding the plurality of module receptacles, at least a first part of each of the inner sealing means being provided on the encircling frame section and at least a second part of each of the inner sealing means being provided on one or more of the separating sections; and
    an encircling outer sealing means projecting from the surface of the leadframe and extending continuously around the encircling frame section at positions (spaced outward from the inner sealing means, the inner sealing means and the outer sealing means sealing off against passage of liquid.

2. The leadframe assembly of claim 1, wherein the separating sections subdivide the frame section into identical or substantially identical module receptacles.

3. The leadframe assembly of claim 1, further comprising tolerance sections provided on the encircling frame section and extending outward from each of the module receptacles.

4. The leadframe assembly of claim 3, wherein the tolerance sections are arranged in parts the encircling frame section on opposite respective sides of each of the respective module receptacles.

5. The leadframe assembly of claim 1, further comprising at least one fastening section arranged in the encircling frame section between the outer sealing means and the inner sealing means for fastening to a battery frame of the battery apparatus.

6. The leadframe assembly of claim 1, wherein the outer sealing means and the inner sealing means are arranged in a common sealing plane of the leadframe.

7. The leadframe assembly of claim 6, further comprising a cooling fluid connection arranged outside the sealing plane in the encircling frame section.

8. The leadframe assembly of claim 1, wherein at least one of the encircling frame section and the at least one separating section have mounting sections for mounting the cell modules.

9. A battery apparatus for an electric vehicle, comprising a battery frame to which the leadframe assembly of claim 1 is fastened and in which cell modules with battery cells are arranged.

10. A method for producing the battery apparatus of claim 9, comprising:
    inserting cell modules into the battery frame,
    fitting and fastening the leadframe assembly to the cell modules and the battery frame.

* * * * *